(12) United States Patent
Bolin et al.

(10) Patent No.: US 9,459,026 B2
(45) Date of Patent: Oct. 4, 2016

(54) SALT COATED WITH NANOPARTICLES

(75) Inventors: Göran Bolin, Täby (SE); Dmitri Glebov, Kista (SE)

(73) Assignee: CLIMATEWELL AB, Hagersten (SE)

( * ) Notice: Subject to any disclaimer, the term of this patent is extended or adjusted under 35 U.S.C. 154(b) by 315 days.

(21) Appl. No.: 14/001,968

(22) PCT Filed: Mar. 1, 2012

(86) PCT No.: PCT/SE2012/050236
§ 371 (c)(1),
(2), (4) Date: Nov. 1, 2013

(87) PCT Pub. No.: WO2012/118437
PCT Pub. Date: Sep. 7, 2012

(65) Prior Publication Data
US 2014/0053582 A1     Feb. 27, 2014

Related U.S. Application Data

(60) Provisional application No. 61/448,309, filed on Mar. 2, 2011.

(30) Foreign Application Priority Data

Mar. 2, 2011 (SE) ...................................... 1150190

(51) Int. Cl.
| | |
|---|---|
| C09K 5/14 | (2006.01) |
| F25B 17/08 | (2006.01) |
| C09K 5/00 | (2006.01) |
| B01D 53/28 | (2006.01) |
| B01J 20/04 | (2006.01) |
| B01J 20/30 | (2006.01) |
| B01J 20/32 | (2006.01) |
| B01J 20/28 | (2006.01) |
| B01J 20/10 | (2006.01) |
| C09K 5/16 | (2006.01) |

(52) U.S. Cl.
CPC .............. *F25B 17/08* (2013.01); *B01D 53/28* (2013.01); *B01J 20/041* (2013.01); *B01J 20/045* (2013.01); *B01J 20/046* (2013.01); *B01J 20/103* (2013.01); *B01J 20/28004* (2013.01); *B01J 20/28011* (2013.01); *B01J 20/28057* (2013.01); *B01J 20/30* (2013.01); *B01J 20/3204* (2013.01); *B01J 20/324* (2013.01); *B01J 20/3219* (2013.01); *B01J 20/3287* (2013.01); *B01J 20/3293* (2013.01); *C09K 5/00* (2013.01); *C09K 5/16* (2013.01); *B01D 2251/404* (2013.01); *B01D 2252/10* (2013.01); *Y10T 428/2991* (2015.01)

(58) Field of Classification Search
CPC ..... B01D 53/28; B01J 20/041; B01J 20/045; B01J 20/046; B01J 20/103; B01J 20/28004; B01J 20/28011; B01J 20/28057; B01J 20/30; B01J 20/3204; B01J 20/3219; B01J 20/324; B01J 20/3287; B01J 20/3293; C09K 5/00; C09K 5/16; C09K 5/14; F25B 17/08
USPC ................ 252/69; 62/112; 427/180; 428/403
See application file for complete search history.

(56) References Cited

U.S. PATENT DOCUMENTS

| | | |
|---|---|---|
| 3,393,155 A | 7/1968 | Dieter et al. |
| 3,580,519 A | 5/1971 | Klein et al. |
| 3,963,627 A | 6/1976 | Cottrell |
| 4,008,170 A | 2/1977 | Allan |
| 4,224,803 A | 9/1980 | Greiner |
| 4,754,805 A | 7/1988 | Rothmeyer |
| 4,993,239 A | 2/1991 | Steidl et al. |
| 5,056,591 A | 10/1991 | Spinner et al. |
| 5,440,889 A | 8/1995 | Sippel et al. |
| 5,753,345 A | 5/1998 | Kuma et al. |
| 6,634,183 B1 | 10/2003 | Jonsson et al. |
| 2002/0043649 A1 | 4/2002 | Mansfeld et al. |

(Continued)

FOREIGN PATENT DOCUMENTS

| | | |
|---|---|---|
| JP | 2009115439 A  * | 5/2009 |
| WO | 01/29285 A2 | 4/2001 |

(Continued)

OTHER PUBLICATIONS

Official Action and Supplementary European Search Report from corresponding EP 2012752917, dated Aug. 21, 2014.

(Continued)

*Primary Examiner* — Douglas McGinty
(74) *Attorney, Agent, or Firm* — Porter Wright Morris & Arthur LLC

(57) ABSTRACT

A salt or CaO coated with hydrophobic nanoparticles comprises an inner part and an outer coating, forming a particle with a permeable membrane keeping liquid inside and letting gas pass. Said inner part comprises at least one selected from a salt and CaO and said outer coating comprises hydrophobic nanoparticles. Known machines and processes can get enhanced functionality the particles comprising salt and nanoparticles. For machines working according to matrix and hybrid principles the particles can act as a matrix, thereby substituting expensive matrix material. Further applications include storage of chemical energy. A device is adapted to perform an absorption process, said device comprising at least one particle. Advantages include that corrosion is reduced or even eliminated. The long term stability of absorption machines is increased and migration of salt in liquid and gas phase is avoided.

34 Claims, 4 Drawing Sheets

(56) References Cited

U.S. PATENT DOCUMENTS

| | | |
|---|---|---|
| 2006/0097223 A1 | 5/2006 | Powers et al. |
| 2006/0177659 A1 | 8/2006 | Chen et al. |
| 2006/0197053 A1* | 9/2006 | Shiflett ............... C09K 5/047 252/67 |
| 2007/0144186 A1* | 6/2007 | Shiflett ............... C09K 5/047 62/112 |
| 2011/0120157 A1* | 5/2011 | Wohlert ............... F25B 15/02 62/101 |
| 2011/0203301 A1* | 8/2011 | Foo ...................... C09K 5/047 62/101 |
| 2012/0079844 A1* | 4/2012 | Bolin .................... F25B 17/08 62/238.3 |
| 2015/0136130 A1* | 5/2015 | DeHaan ............... A61K 9/0075 128/203.15 |

FOREIGN PATENT DOCUMENTS

| | | |
|---|---|---|
| WO | 02/32569 A1 | 4/2002 |
| WO | 2006/052748 A2 | 5/2006 |
| WO | 2006/137957 A1 | 12/2006 |
| WO | 2007/139476 A1 | 12/2007 |
| WO | 2007139476 A1 | 12/2007 |
| WO | 2009070090 A1 | 6/2009 |
| WO | 2009070090 A8 | 6/2009 |
| WO | 2009/102271 A1 | 8/2009 |

OTHER PUBLICATIONS

Zhang et al., In-situ, simultaneous milling and coating of particulates with nanoparticles, Powder Technology, 196:292-297 (2009).

* cited by examiner

SALT COATED WITH NANOPARTICLES

TECHNICAL FIELD

The present invention relates to a particle comprising an inner part and an outer coating and it also relates to a device comprising a particle. The inner part comprises at least one selected from a salt and CaO and the outer coating comprises hydrophobic nanoparticles. The device is suitable for performing an absorption process. Examples of such devices include but are not limited to an absorption chemical heat pump.

BACKGROUND

Salts in connection with other substances including silica are known. U.S. Pat. No. 5,753,345 discloses an adsorber for humidity and odorous gas exchange. A silica sol is coated on a sheet to obtain an adsorbing body. The silica particles have a diameter <120 Å and a plurality of stable silanol radicals on the surface, giving strong binding ability. The silica sol optionally comprises a humidity absorbing agent such as for instance lithium salts, magnesium salts and calcium salts. The silica sol coating is applied on a sheet or a laminate and dried to gelatinize it and is then rigidly fixed on said sheet or laminate.

Tablets of salts together with binders are also known. US 2006/0097223 discloses a device for controlling relative humidity with a solidified humectant composition. The solidified humectant composition is made from a humectant salt, water, and a carrier. The solidified humectant may be formed into a tablet with the aid of a binder, or it may be contained within a thermoformed felt material, a sachet, or a water permeable canister. Examples of salts include $CaCl_2$, $K_2CO_3$, $LiCl_2$, NaCl, and $K_2SO_4$. Examples of carriers include silica gel.

The principle of the operation of chemical heat pumps is well-known, see for example U.S. Pat. Nos. 5,440,889, 5,056,591, 4,993,239, 4,754,805 as well as U.S. Pat. No. 6,634,183. Many chemical heat pumps comprise at least one salt as an active substance and at least one liquid. In U.S. Pat. No. 6,634,183 there is described a solid phase of an active substance primarily located inside a net, while a solution phase is able to pass the net. There is further provided distribution means such as a pump to make the separated active substance in liquid state or solution phase pass in contact with a heat exchanger and the active substance in solid state.

A drawback relating to the use of salt solutions in absorption processes is that corrosion easily occurs. Corrosion typically results in the formation of non condensable gases, mainly hydrogen gas ($H_2$), or even rupture of the building material in a machine working according to the absorption process. The effects of corrosion gases decrease or stop the absorption process. A problem in connection with corrosion is that hydrogen gas has to be purged from the system.

In known absorption processes, the problem of corrosion is difficult to solve since corrosion can only partly be inhibited by for example the addition of different corrosion inhibitors, adjustment of the pH or by choosing a corrosion resistant material from the group of noble, and thereby expensive, metals.

US 2002/0043649 describes an effort to control the corrosion in heat pumps by adding a rare earth metal salt to the heat pump's ammonia/water working fluid. In preferred embodiments, the rare earth metal salt includes cerium, and the steel surfaces are cerated to enhance the corrosion-inhibiting effects.

Although chemical heat pumps working in accordance to the hybrid principal and involving a matrix are used successfully today, see for example PCT applications WO 2007/139476 and WO/2009/102271, the long term stability can still be improved. Sometimes, liquid migration of the salt inside the matrix may occur over long periods of time. This salt migration causes an uneven salt concentration in the matrix, resulting in a decreased performance of the machine. Moreover, in such a machine, salt can also migrate in liquid droplets with the gas flow and thereby slowly contaminate the condenser/evaporator. This affects the performance of the heat pump negatively. Thus, regarding the long term stability there is room for improvement.

Yet another problem with chemical heat pumps working in accordance to the hybrid principle involving a matrix is that the matrix material itself may be of a corrosion sensitive material. The corrosion of the matrix may result in general corrosion related problems such as release of corrosion gases but it may also result in the degradation of the matrix, an unwanted side effect.

In chemical heat pumps working in accordance to the hybrid principle involving a matrix, the gas transport during charging and discharging is reduced by salt water solution blocking the gas channels in the matrix. It is desired to reduce or eliminate this problem.

In chemical heat pumps working in accordance to the hybrid principle involving a matrix, the volume of the gas channels in the matrix vary depending on the amount of liquid absorbed in the matrix, this variation may lead to unwanted effects. It is desired to reduce or even eliminate this problem.

In chemical heat pumps working in accordance to the hybrid principle involving a matrix or working according to principals of falling film it is always beneficial for good performance to have a great surface contact between the gas phase and the salt. This is valid both during charging and discharging. Thus it is desired to increase the contact area between a gas phase and a salt in a chemical heat pump working according to the hybrid principle. In the present chemical heat pumps working in accordance to the hybrid principle there is room for improvement regarding the surface area.

"Dry water" is a known material comprising water and hydrophobic nanoparticles. The material is a free flowing powder that is prepared by mixing water, hydrophobic nanoparticles, e.g. silica derivatives such as silica dimethyl silylate, and air at high speeds. The mixing at high speeds results in a water-in-air emulsion, creating particles where the nanoparticles are arranged enclosing small water droplets, acting as a barrier between the environment and water. The water droplets are separated and prevented from fusing. The emulsion formed is dry and can be poured as a free flowing powder. The concept of dry water and how it is made has been known since the 1960's, see for example U.S. Pat. Nos. 3,393,155 and 4,008,170, however in recent years dry water has regained interest. Application areas for dry water have for example been mentioned to be an ingredient in cosmetics, for storage of gases or for speeding up catalytic reactions. One problem with structures made of dry water is that they tend to collapse when they are heated so that the water evaporates. Thus it is difficult to obtain a fully reversible process.

In the prior art there is further a need for an energy carrier which is easy, simple and economical to transport.

SUMMARY

It is an object of the present invention to obviate at least some of the problems in the prior art and to provide an improved particle, an improved device and a method for manufacturing the particle.

In a first aspect there is provided a particle comprising an inner part and an outer coating, said inner part comprises at least one selected from a salt and CaO and said outer coating comprises hydrophobic nanoparticles, wherein the particle has an average size from 1 to 1000 μm.

In a second aspect there is provided a device adapted to perform an absorption process, said device comprising a particle, the particle comprising an inner part and an outer coating, said inner part comprises at least one selected from a salt and CaO and said outer coating comprises hydrophobic nanoparticles, wherein the particle has an average size from 1 to 1000 μm.

There is further provided use of the salt and/or CaO coated with nanoparticles in an absorption process.

There is further provided a method for manufacturing a particle comprising a salt coated with nanoparticles.

Advantages of the invention include that corrosion is reduced or even eliminated because the corrosive salt is enclosed within the nanoparticles. The long term stability of absorption machines is increased, since salt and/or CaO is enclosed with nanoparticles, forming particles of coated salt and/or CaO. An NCS particle refers to a particle comprising a salt and/or CaO coated with hydrophobic nanoparticles. The forming of a NCS particle stops or essentially stops salt migration in both gas and liquid phase. During operation together with a volatile liquid, the salt is enclosed within the particle and cannot obstruct the flow of gas between NCS particles.

The surface area is increased due to the small size of the NCS particles. In one embodiment, a surface contact of 100 times greater than in comparable machines in the prior art is achieved by using the NCS particle. The comparable machines in the prior art refers to well known machines such as falling film machines and spraying machines.

Another advantage for absorption machines comprising the NCS particle of the present invention is that the present NCS particles allow an absence of expensive circulating pumps and expensive heat exchangers that corrode with time and requires permanent service for example to refill pH buffer and corrosion inhibitors and vacuum pumping/purging of hydrogen gas that is the result of corrosion of a metal.

Yet another advantage of the NCS particles is that in certain aspects they behave as a solid and therefore any migration of liquid caused by gravity and/or temperature gradients is stopped and the problem with an uneven salt concentration in a matrix can therefore be overcome. Even if exposed to humid air, the NCS particles do not migrate or fuse forming lumps but stay as a free flowing powder due to the stable nature of the NCS particle. Moreover, since the salt is enclosed in the NCS particle, the problem of possible corrosion of the matrix material is overcome since the salt essentially does not come in contact with the matrix material.

The salt coated with nanoparticles offers a new possibility for machines working according to matrix and hybrid principles (see for example WO 2007/139476 and WO/2009/102271), since the material in itself can act as a matrix, the NCS particle can thereby substitute expensive matrix material. The salt coated with nanoparticles comprises an inner part and an outer coating, forming a particle with a permeable membrane keeping liquid inside and allowing gas to pass in or out. Thus, no additional matrix is needed in absorption machines working with a matrix according to the hybrid principle.

Still another advantage is that in an absorption machine the channel structure between the present NCS particles remains constant compared to prior art where the channel structure is a function of liquid content and results in liquid film formation and process termination despite of the possible presence of dry salt in the bulk. The present particles also keep essentially the same volume regardless if they are full of liquid or totally dry and thereby never or essentially never block the gas channels in the matrix. The NCS particle (in one embodiment with a size of 45-100 μm) always gives a 40% free space by laws of geometry.

Yet another advantage is that the salt and/or coated with nanoparticles is characterized by its ability to fully release its liquid content by influence of heat up to a high temperature without collapsing. Subsequently, it can regain the liquid if vapor and cooling is available. In one embodiment the NCS particle can be used at temperatures above 400° C. This recycling ability makes, in contrast to "dry water", new applications possible and enhanced functionality can be given to known machines and processes. "Dry water" collapses when water is removed from the structure.

Given the advantages above, it is realized that absorption machines are very well suited for use with the present NCS particles.

The salt and/or CaO coated with hydrophobic nanoparticles can be easily transported in plastic bags, paper bags, drums and does not require expensive and corrosion resistant plastic/metal containers.

BRIEF DESCRIPTION OF THE DRAWINGS

The invention is described, by way of example, with reference to the accompanying drawings, in which.

DETAILED DESCRIPTION

Figure 1:
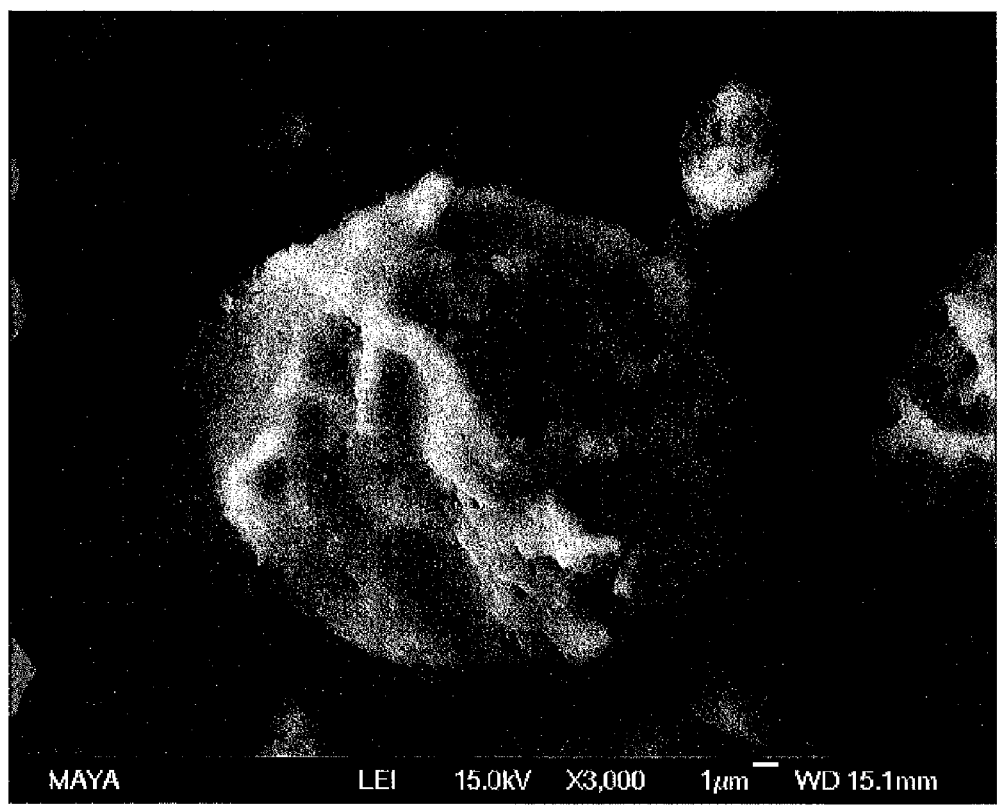
FIG. 1 shows a SEM micrograph of an NCS particle. The particle was manufactured from a solution of LiBr in water and coated with silica which was polydimethylsiloxy modified.
Figure 2:
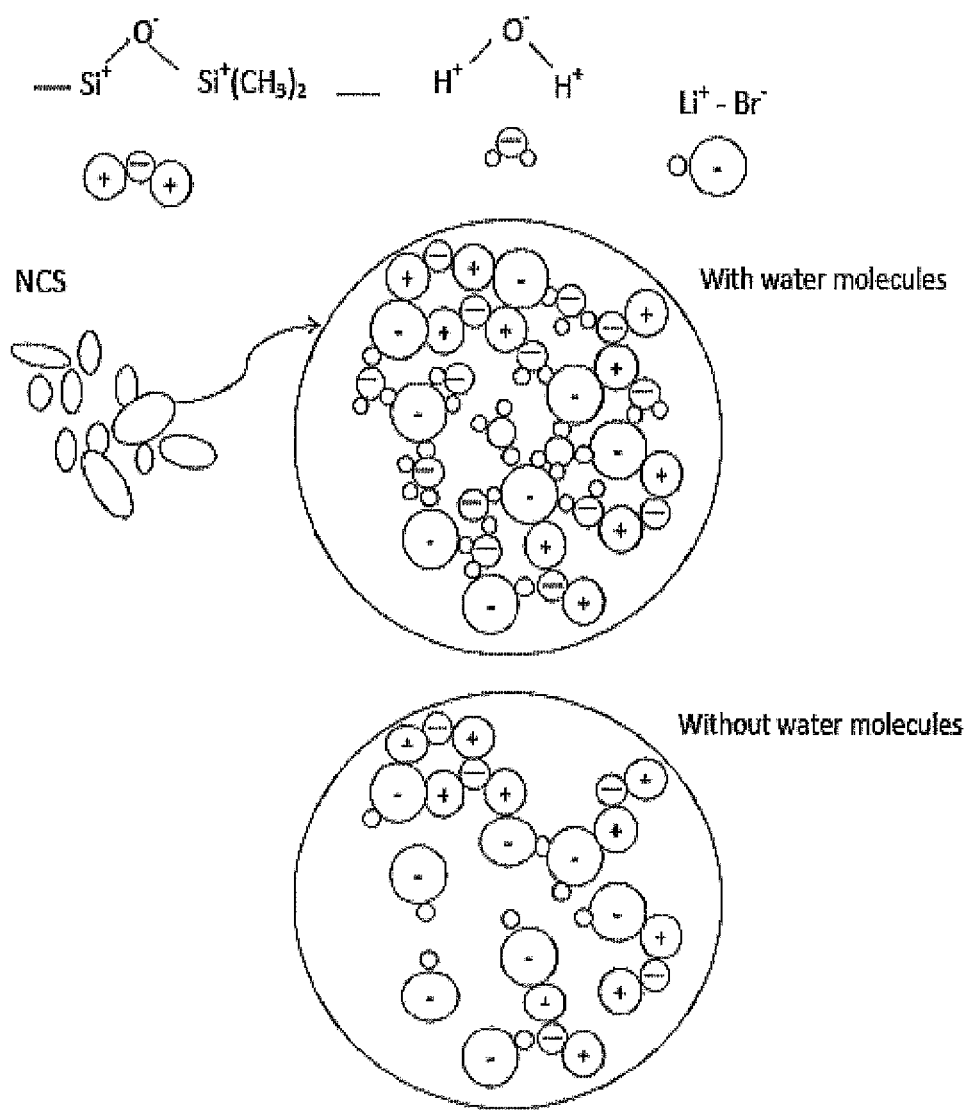
FIG. 2 shows a schematic drawing of NCS particles with and without water molecules.

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

The term "about" as used in connection with a numerical value throughout the description and the claims denotes an interval of accuracy, familiar and acceptable to a person skilled in the art. Said interval is ±10%.

"Average size" is used in connection with a nanoparticle or a particle to denote the average of the size. The definition is based on replacing a given irregularly shaped particle with an imaginary sphere that has the volume identical with the irregularly shaped particle. This volume based particle size equals the diameter of the sphere that has same volume as a given irregularly shaped particle.

"Hygroscopic" is used herein to denote the ability of a substance to attract water molecules or molecules with similar properties as water from the surrounding environment through either absorption or adsorption.

"Hydrophobic" is used herein to denote the property of being water-repellent, tending to repel and not absorb water.

"Nanoparticle" is used herein to denote a localized object with a volume and a mass. In particular "nanoparticle" is used to denote particles which form the coating of the NCS particle. "Nanoparticles" are thus smaller than the NCS particle.

"NCS particle" is used herein to denote a localized object with a volume and a mass. In particular "particle" and/or "NCS particle" is used to denote an object comprising a salt which object is coated with very small particles called nanoparticles. Thus the word "particle" may refer to an object comprising an inner part and an outer coating, wherein the outer coating comprises nanoparticles, which nanoparticles are smaller than the particle. NCS is an abbreviation of nano coated salt.

"Salt" is used herein to denote a compound formed by interaction of equivalent amounts of an acid and a base. The term "salt" as used herein includes alkaline salts, i.e. salts that hydrolyze to produce hydroxide ions when dissolved in water and acid salts, i.e. salts that hydrolyze to produce hydronium ions in water.

In the present invention a salt and/or CaO is coated with hydrophobic nanoparticles obtaining a NCS particle.

In a first aspect there is provided a particle comprising an inner part and an outer coating, said inner part comprises at least one selected from a salt and CaO and said outer coating comprises nanoparticles, wherein the particle has an average size from 1 to 1000 μm.

It is to be understood that the particle comprises at least one coating. Thus the particle may comprise several coatings. The inner part of the particle may in turn comprise several different parts.

The inner part comprises at least one selected from a salt and CaO. In one embodiment the inner part comprises a salt. In one embodiment the inner part comprises CaO. An advantage of CaO is that high temperatures can be utilized. The skilled person realizes that when CaO is utilized in a process involving $H_2O$, also $Ca(OH)_2$ is in the NCS particles at least during some conditions, thus also $Ca(OH)_2$ is encompassed within the term CaO.

In general any salt can be used. The salt is an ionic compound. In one embodiment the salt is in a dry state. In an alternative embodiment the salt is hydrated, i.e. the salt contains water molecules inside the crystal lattice. In yet another embodiment the salt is dissolved at least partially in water.

In one embodiment, the salt is hygroscopic. In one embodiment the salt is selected from chlorides, chlorates, perchlorates, bromides, iodides, carbonates, and nitrates of lithium, magnesium, calcium, strontium, barium, cobalt, nickel, iron, zinc, manganese, potassium, and aluminum as well as sulphides and hydroxides of lithium, sodium and potassium. In another embodiment the salt is selected from $Na_2S$, LiBr, LiCl, $CaCl_2$, and $CaBr_2$. In one embodiment the salt is selected from magnesium chloride, zinc chloride, potassium carbonate, potassium hydroxide and sodium hydroxide. Where existing, all hydrated versions of all above salts are also encompassed. As a non limiting example $Na_2S*9H_2O$ is encompassed.

The nanoparticles are hydrophobic. In one embodiment the nanoparticles comprise at least one material selected from hydrophobically modified $SiO_2$ particles and carbon materials. In one embodiment the nanoparticles comprise hydrophobically modified silica particles. Hydrophobically modified $SiO_2$ particles encompass particles comprising $SiO_2$ and which have been modified to obtain hydrophobic properties. In one embodiment the hydrophobic nanoparticles comprise $SiO_2$, and are modified by covalently bound hydrophobic compounds. In one embodiment the nanoparticles comprise at least one silica derivative. Hydrophobically modified $SiO_2$ particles include but are not limited to particles of silica modified with dimethyl silylate.

The term carbon material encompasses material based on carbon. Examples of carbon materials include but are not limited to graphite and graphene. Particles of carbon have the advantage of improved heat conductivity compared to silica.

In one embodiment the average size of the nanoparticles is about 10 nm. In one embodiment the average size of the nanoparticles is from 1 to 50 nm. In another embodiment the average size of the nanoparticles is from 1 to 20 nm.

In one embodiment the hydrophobic nanoparticles are made of modified pyrogenic silica. In the following paragraph the manufacture of such particles are described. The silica ($SiO_2$) can be formed from $SiCl_4$ and $H_2$ in a flame at over 1000° C. This gives $SiO_2$ particles, primary nanoparticles in the size range about 5-50 nm. The primary nanoparticles may fuse together to form larger aggregates typically 100-1000 nm in size. In some embodiments the larger aggregates of nanoparticles are elongated structures. The particle size for the nanoparticles refers to the primary nanoparticles before they aggregate into larger structures. The $SiO_2$ particles are modified in a gas phase with —Si—O—Si bonds to the particles. —Si—OH groups on the surface of the particles are reacted with X—Si— groups on the modifiers, where X is a halogen atom to obtain a covalent bond between the modifier and the particle. Modifiers include but are not limited to organochlorosilanes such as dimethylchlorosilane, polydimethylsiloxanes, hexamethyldisilazane, and long chain alkylsilanes such as octylsilanes. This modification gives hydrophobic silica particles. In one embodiment the hydrophobic silica particles have 1-Si—OH group per 1 $nm^2$. In an alternative embodiment the hydrophobic silica particles have 0.5-Si—OH groups per 1 $nm^2$.

Typical physical data for the hydrophobically modified silica nanoparticles manufactured as described in the previous paragraph are as follows: BET surface area measured according to DIN EN ISO 9277/DIN 66132 varies from about 90 to about 250 $m^2/g$. pH in a 4% dispersion in a 1:1 mixture of water:methanol measured according to DIN EN ISO 787-9 varies from about 3.8 to about 8.0. The tamped density measured according to DIN EN ISO 787/11 varies between about 40 to about 70 g/l. The weight loss during drying for 2 h at 105° C. measured according to DIN EN ISO 787-2 varies between about less than 0.5 wt % to less than about 1.5 wt %. The carbon content measured according to DIN EN ISO 3262-20 varies from about 1.0 to about 4.5 wt %.

The NCS particles have in one embodiment an average size in the range 20-100 μm, including the coating. In an alternative embodiment the NCS particles have an average size from 5 to 500 μm. The average size of the NCS particles always includes the coating. It must be realized that the NCS particles can agglomerate to clusters comprising many NCS particles. The average particle size is measured without agglomeration of NCS particles.

In one embodiment the particle further comprises at least one liquid. In one embodiment the inner part of the particle comprises at least one liquid. In one embodiment the particle further comprises water.

In a second aspect there is provided a device adapted to perform an absorption process, said device comprising at least one particle, wherein said particle comprises an inner part and an outer coating, wherein said inner part comprises at least one selected from the group consisting of a salt and CaO and wherein said outer coating comprises nanoparticles, and wherein said particle has an average size from 1 to 1000 μm.

In one embodiment the device is an absorption chemical heat pump. In one embodiment the device is an apparatus for cooling adapted to utilize an absorption process. In one embodiment the device is a machine for gathering excess heat adapted to utilize an absorption process. In one embodiment the device is a device for storage of energy adapted to utilize an absorption process. In one embodiment the device is a thermal solar collector adapted to utilize an absorption process. In one embodiment the device is a roof brick or roof cover panel for production of cooling and heating adapted to utilize an absorption process.

There is further provided use of a particle as described above in an absorption process. In one embodiment the absorption process is carried out in a chemical heat pump.

In one embodiment a particle as described above is used as storage of chemical energy. In one embodiment of the storage said inner part comprises CaO. CaO is advantageous to use as storage of chemical energy since high temperatures can be utilized. A high temperature difference ΔT gives high efficiency.

There is further provided a method for manufacturing a particle comprising an inner part and an outer coating, said inner part comprising at least one selected from the group consisting of a salt and CaO and said outer coating comprising hydrophobic nanoparticles, said method comprising the steps: a) mixing at least one selected from a salt and CaO with hydrophobic nanoparticles, and b) mixing with sufficient energy to obtain particles comprising at least one selected from a salt and CaO coated with nanoparticles.

In one embodiment the at least one selected from a salt and CaO and the nanoparticles are mixed together with at least one liquid in step a). In an alternative embodiment the salt and/or CaO is mixed with the nanoparticles without adding any liquid.

The NCS particle has several fields of use. One non limiting example is the use in a device adapted to perform an absorption process, said device comprising a salt coated with nanoparticles.

In one embodiment the particle comprise at least one liquid. In one embodiment the liquid comprises water. In one embodiment the liquid is water. Most of the liquid resides in the inner part of the particle. The coating is permeable to the liquid. Possible solvents in addition to water include but are not limited to methanol, ethanol, ammonia, methylamine, ethylamine, and liquid $CO_2$.

Without wishing to be bound by any particular scientific theory the inventor believe that the nanoparticles are attracted to the inner part of the particle by an attractive force (Debye force) between a dipole and an induced dipole. The salt with or without water displays a dipole, whereas the nanoparticles possess a polarisability. Thus the nanoparticles are preferably chosen from materials that are polarisable.

The NCS particles should float if put on the surface of water. It is possible to test manufactured NCS particles after coating by gently placing NCS particles on the surface of water. It the NCS particles float on the air-water surface the NCS particles are good. If the NCS particles do not float something with the manufacturing process may be wrong, or the starting material may be unsuitable.

The NCS particle is an interesting material for many application areas, in particular for absorption processes.

With the NCS particle of the present invention, corrosion is greatly reduced and even very corrosion sensitive materials such as aluminum might be considered for use as material for a machine working according to the absorption process. The reason for this is that the salt essentially stays inside the barrier of nanoparticles due to strong surface tension; the nanoparticle coating is only permeable to the gas phase of the solvent. The salt thereby never or to a very limited extent comes in contact with the corrosion sensitive material.

With the reduced corrosion characteristics of the NCS particle of the present invention, an absorption process can also be performed in atmospheric pressure as opposed to a vacuum environment. If the salt was not coated with the nanoparticles, the oxygen contents in the atmospheric air would decrease the lifetime of the absorption process due to heavy corrosion. The NCS particle of the present invention therefore opens up many new application areas for absorption processes comprising a salt.

Moreover, in today's absorption processes, large heat exchanging surfaces, preferably comprising a metal, are needed to create large contact surfaces between the salt and the gas phase of the solvent as well as to create an effective heat transport to and from the solvent. Also, moving parts in an absorption machine, such as pumps used to create a falling film, are used to increase the contact surfaces. By separating and enclosing the salt within a layer of nanoparticles, the contact surface between the salt and the solvent in gas phase is automatically increased. Thereby, the transfer of heat to and from the solvent can be performed by direct contact between the salt and the gas phase of the solvent, without any additional heat exchanging surfaces. Moreover, the need for using pumps and the falling film technique is reduced or even eliminated.

By preparing a coated salt, the salt acquires new characteristics. The new characteristics of the NCS particle of the invention results in new application areas for salts in absorption processes. For example, the NCS particles can be pumped in the same way as a pure liquid or a free flowing powder and can in other words be distributed in the same way as district heating and cooling, where pure water is normally used. A non coated salt would be impossible to apply in district heating or cooling, but the coated salt reduces corrosion in the process greatly, has 10 times higher energy density than pure water and causes no crystallization of salt particles in the pumping process. The NCS particle can store chemically bonded energy that can be released when and where needed, creating heating or cooling. Since the NCS particle has a high energy density and essentially does not lose its energy over time if stored properly, the material can be transported long distances. The NCS particle can for example be charged (heated) where there is excess energy, e.g. industry, far away from the end user, and later be transported and discharged where energy is needed.

In contrast to conventional district heating and cooling, only ¹/₁₀ of a normal pipe diameter is needed to distribute a known amount of energy with the NCS particle compared to pure liquid water. This is because the coated particle has 10 times the energy density compared to pure liquid water due to the heat pumping capacity of the NCS particle. Moreover, the distribution pipes for district heating or cooling can when using the NCS particle of the present invention be produced in cheap plastic material and do not acquire any insulation since the NCS particle material contains latent energy as opposed to sensible energy. Since a pipe of a distribution system using NCS particles does not need to be placed in a frost protected environment, the pipes can instead be placed in the ground in the same way as a fiber cable. No special pipes for heating or cooling are needed and since heating and cooling is not used simultaneously, the distribution pipe can be dimensioned only based on the average need for heating.

Application areas for the NCS particle include but are not limited to:
Absorption chemical heat pumps for cooling and heating purposes,
Absorption chemical heat pumps working according to the hybrid principle (see for example WO 2007/139476 and WO/2009/102271) for cooling, heating and energy storage purposes,
Machines that use absorption processes for desiccant cooling and humidity control for good indoor climate,
Desiccant facilities and humidity control for good indoor climate,
Gathering and storing of excess heat or waste heat from for example industry or vehicles to be used for heating or cooling for end users such as industry, hospitals, offices or private homes.
Storing gathered heat for later use.
The NCS particles may be used instead of water as an energy carrier, extending the ability in a district heating grid, to contain also district cooling. In such a grid with the present NCS particles as energy carrier the piping could be reduced due to significantly higher energy density compared to water.
To use the present NCS particles as energy storage or seasonal storage for solar energy or waste heat from industry, to be used by industry, hospitals, offices, or private homes,
Cleaning or storing of hazardous exhausts gases such as methane, hydrogen, carbon dioxide, carbon oxide and other gases from combustion engines in vehicles, industry or other sources of gas emission. Allowing a subsequent regeneration of the present NCS particles when the hazardous gases are brought out of harm's way from for instance densely populated areas to a place where the gases safely can be taken care of,
Converting thermal solar collectors from only heating, to both heating and cooling purposes,
Roof brick and roof cover panels can with the present NCS particles achieve extended functionality and this building material can be used for production of cooling and heating to the building,
Drinking water production out of humid air by means of converted thermal solar collectors, roof bricks and roof cover panels with the present NCS particles,
Maintenance of exact humidity in archives, museums and other relevant places,
Extinction of fires, especially in electronic equipment, where the present NCS particles can be regenerated by humidity and used again.

A common feature for many application areas is that the NCS particle is used in an absorption process. A volatile liquid in gas phase is absorbed by the coated salt in an exothermic reaction. When the coated salt containing the volatile liquid is heated, the liquid is released as a gas in an endothermic reaction.

Other features and uses of the invention and their associated advantages will be evident to a person skilled in the art upon reading the description and the examples.

It is to be understood that this invention is not limited to the particular embodiments shown here. The following examples are provided for illustrative purposes and are not intended to limit the scope of the invention since the scope of the present invention is limited only by the appended claims and equivalents thereof.

EXAMPLES

Example 1

In one experiment 95 parts of an aqueous solution of LiBr (32 wt %) was poured into a blender of type OBH Nordica 1.5 L and 5 parts of a hydrophobic silica derivative was added to the salt solution. Mixing was carried out at >10 000 rpm during three intervals, each interval lasting approximately 30 s. The resulting material was a dry and free flowing white powder. The salt coated with nanoparticles was thereafter heat treated.

Example 2

Corrosion Properties of a Salt Coated with Nanoparticles on Copper, Steel and Aluminum The salt coated with nanoparticles was prepared according to example 1 above. The original LiBr content in the aqueous solution was 32 wt %.

One teaspoon of the salt coated with nanoparticles was put on three different metals:
copper
steel
aluminum
The metals were heated in an atmospheric environment in an oven at 300° C. for about 1 hour.

For comparative reasons, an aqueous solution of 32 wt % LiBr was poured on a copper sheet and heated on a heat plate for about 15 minutes (less than 300° C.).

Corrosion occurred rapidly on the copper sheet when the aqueous salt solution was used. A blue/green color of oxidation products became very clear and a hole was formed in the sheet. The copper sheet that was exposed to the salt coated with nanoparticles did not show any signs of corrosion.

Neither did the metal sheets of steel and aluminum show any signs of corrosion when being exposed to the salt coated with nanoparticles.

Example 3

Reversibility of the Salt Coated with Nanoparticles when Used in an Absorption Process The salt coated with nanoparticles was prepared according to example 1 above. The original LiBr content in the aqueous solution was 32 wt %. A reactor in a small scale absorption machine was filled with 50 gram of the salt coated with nanoparticles, the salt coated with nanoparticles thereby containing 34 gram water. The reactor was connected to a condenser/evaporator via a gas transport channel. The condenser/evaporator was filled with 100 gram of water.

The absorption machine was charged by heating the reactor to 120-150° C. during 4-12 hours with a heat sink on the condenser/evaporator side of approximately 6° C.

The absorption machine was discharged by heating the condenser/evaporator to 17° C. while having a heat sink of approximately 25-30° C. connected to the reactor.

During charging, water evaporates from the salt coated with nanoparticles and is transported as water vapor to the condenser/evaporator where the vapor condenses and forms pure liquid water. The charging process can be continued until there is no water left in the salt coated with nanoparticles. It appears as though the salt coated with nanoparticles does not alter its appearance or break down into separate salt particles and nanoparticles. Moreover, during discharge the "dry" salt coated with nanoparticles can again absorb water vapor coming from the condenser/evaporator without changing its appearance and while still being a dry powder.

Measurements of the reversibility of the salt coated with nanoparticles were made during the absorption process described above. After charging, the reactor was weighed on an accurate scale to investigate how much water that had left the salt coated with nanoparticles. After discharging, the reactor was weighed once more to investigate how much water that had returned to the salt coated with nanoparticles in the reactor. Two parallel modules where running at the same time.

The changes shown in the table below depends on variations in ambient conditions. However, over time the tests in both of the modules show that the same or more content of water gradually returns to the reactor. The gradual increase could mean that the useable range of possible utilization (absorbing water) of the salt coated with nanoparticles is always well above the normal range.

| Day | Measurement # | Returning water to the reactor (gram) |
|---|---|---|
| 1 | 1 | 32.3 |
| 2 | 2 | 27.0 |
| 2 | 3 | 30.9 |
| 3 | 4 | 29.5 |
| 3 | 5 | 32.5 |
| 4 | 6 | 32.8 |
| 4 | 7 | 34.5 |
| 5 | 8 | 37.2 |
| 5 | 9 | 32.4 |
| 6 | 10 | 37.1 |
| 6 | 11 | 37.4 |
| 7 | 12 | 34.5 |
| 7 | 13 | 35.8 |
| 8 | 14 | 37.0 |
| 8 | 15 | 38.7 |

The above results confirm the reversibility concerning absorption and desorption of water for the salt coated with nanoparticles.

The test was also carried out with as high charging temperature as 190° C. to show stability of the salt coated with nanoparticles to high temperatures.

Example 4

Contamination by Means of Migrations of Salt Droplets to the Condenser/Evaporator The salt coated with nanoparticles was prepared according to example 1 above. A reactor in a small scale absorption machine was filled with the salt coated with nanoparticles. The reactor was connected to a condenser/evaporator via a gas transport channel. As a barrier between the reactor and the condenser/evaporator, a filter with large enough pores to prevent the salt coated with nanoparticles from escaping to the condenser/evaporator was placed.

The absorption machine was charged by heating the reactor to 120-150° C. during 4-12 hours with a heat sink on the condenser/evaporator side of approximately 6° C.

During charging, the water evaporates from the salt coated with nanoparticles and is transported to the condenser/evaporator via the gas transport channel. In the condenser/evaporator, the water vapor condenses to liquid water.

After charging was complete, the condenser/evaporator was opened and the liquid water was analyzed for possible salt ions to investigate if any of the salt had been transported with the water vapor to the condenser/evaporator.

Three liquid samples were prepared in three beakers: a) contaminated water—a sample from a prior art machine; b) condenser/evaporator water from a machine with salt coated with nanoparticles; c) distilled water—reference. The presence of salt traces (lithium bromide in the present example) can be determined by means of a silver nitrate reagent. The silver nitrate forms a non soluble silver bromide that develops as a milky/opaque color. $LiBr+AgNO_3 \rightarrow AgBr\downarrow +LiNO_3$ The silver nitrate reagent was added to all three beakers. Case a) revealed the presence of bromide ions in the liquid. The cases b) and c) revealed the absence of bromide ions in the liquid, i.e. the water from the condenser/evaporator of the present example was completely pure and clean from any salt ions, i.e. the salt stays inside the network of nanoparticles in the NCS particle.

Migration of micro droplets of salt solution inside the machine can thereby be stopped by using the NCS material, due the binding forces of the salt inside the salt coated with nanoparticles.

Example 5

Open Channels for Gas Penetration

Open channels ensure the gas access for interaction with the salt coated with nanoparticles. The size of the channels remains the same and does not change with time. Large contact surface (700-1000 $cm^2/cm^3$) ensures effective interaction between the salt coated with nanoparticles material and gas.

Example 6

Four different types of NCS particles were prepared from $LiCl$, $Na_2S*9H_2O$, $CaO$, and $LiBr$ respectively. The nanoparticles were silica particles with polydimethylsiloxy-groups covalently bound to the surface.

For the nanoparticles the BET surface area measured according to DIN EN ISO 9277/DIN 66132 was about 120 $m^2/g$. pH in a 4% dispersion in a 1:1 mixture of water:methanol measured according to DIN EN ISO 787-9 varied from about 4.0 to about 6.0. The tamped density measured according to DIN EN ISO 787/11 was about 50 g/l. The weight loss on drying for 2 h at 105° C. measured according to DIN EN ISO 787-2 was less than about 0.6 wt %. The carbon content measured according to DIN EN ISO 3262-20 was about 4.5 wt %.

The salt and the nanoparticles were mixed in a blender of type OBH Nordica 1.5 L. Mixing was carried out at >10 000 rpm during three intervals, each interval lasting approximately 30 s. The resulting material was a uniform free flowing powder that did not get wetted in water.

Example 7

In one experiment 98 parts of solid CaO was placed into a blender of type OBH Nordica 1.5 L and 2 parts of a hydrophobic silica derivative was added as well. Mixing was carried out at >10 000 rpm during one interval of approximately 30 s. The resulting material was a dry and free flowing slightly gray powder.

For the nanoparticles the BET surface area measured according to DIN EN ISO 9277/DIN 66132 was about 120 m2/g. pH in a 4% dispersion in a 1:1 mixture of water:methanol measured according to DIN EN ISO 787-9 varied from about 4.0 to about 6.0. The tamped density measured according to DIN EN ISO 787/11 was about 50 g/l. The weight loss on drying for 2 h at 105° C. measured according to DIN EN ISO 787-2 was less than about 0.6 wt %. The carbon content measured according to DIN EN ISO 3262-20 was about 4.5 wt %.

Example 8

In one experiment 93 parts of an aqueous solution of LiCl (40 wt %) was poured into a blender of type OBH Nordica 1.5 L and 7 parts of a hydrophobic silica derivative was added to the salt solution. Mixing was carried out at >10 000 rpm during two intervals, each interval lasting approximately 30 s. The resulting material was a dry and free flowing white powder. The salt coated with nanoparticles was thereafter heat treated.

For the nanoparticles the BET surface area measured according to DIN EN ISO 9277/DIN 66132 was about 120 m2/g. pH in a 4% dispersion in a 1:1 mixture of water:methanol measured according to DIN EN ISO 787-9 varied from about 6.5 to about 8.0. The tamped density measured according to DIN EN ISO 787/11 was about 200 g/l. The weight loss on drying for 2 h at 105° C. measured according to DIN EN ISO 787-2 was less than about 0.6 wt %. The carbon content measured according to DIN EN ISO 3262-20 was about 2.8 wt %.

Example 9

Particle Stability of the CaO Coated with Nanoparticles when Used in an Absorption Process The CaO coated with nanoparticles was prepared according to example 7 above. A reactor made of small copper dish in a small scale absorption machine made of glass was filled with 0.4 gram of the CaO coated with nanoparticles. The reactor was connected to a condenser/evaporator via a gas transport channel. The condenser/evaporator was filled with 0.5 gram of water.

The absorption tube was charged by heating the reactor to 370-400° C. during 1 minute with an induction heater. A heat sink on the condenser/evaporator side is an ambient air of approximately 21° C.

The absorption machine was discharged during 3 minutes by shutting off the induction heater. The condenser/evaporator was kept at room temperature approximately to 21° C. during the discharge.

During charging, calcium hydroxide coated with nanoparticles decomposes into CaO coated with nanoparticles and water that evaporates and is transported as vapor to the condenser/evaporator side of a glass tube where the vapor condenses and forms pure liquid water. It appears as though the CaO coated with nanoparticles does not alter its appearance or break down into separate oxide particles and nanoparticles. Moreover, during discharge the "dry" CaO coated with nanoparticles can again absorb water vapor coming from the condenser/evaporator without changing its appearance and while still being a dry powder.

Figure 3:
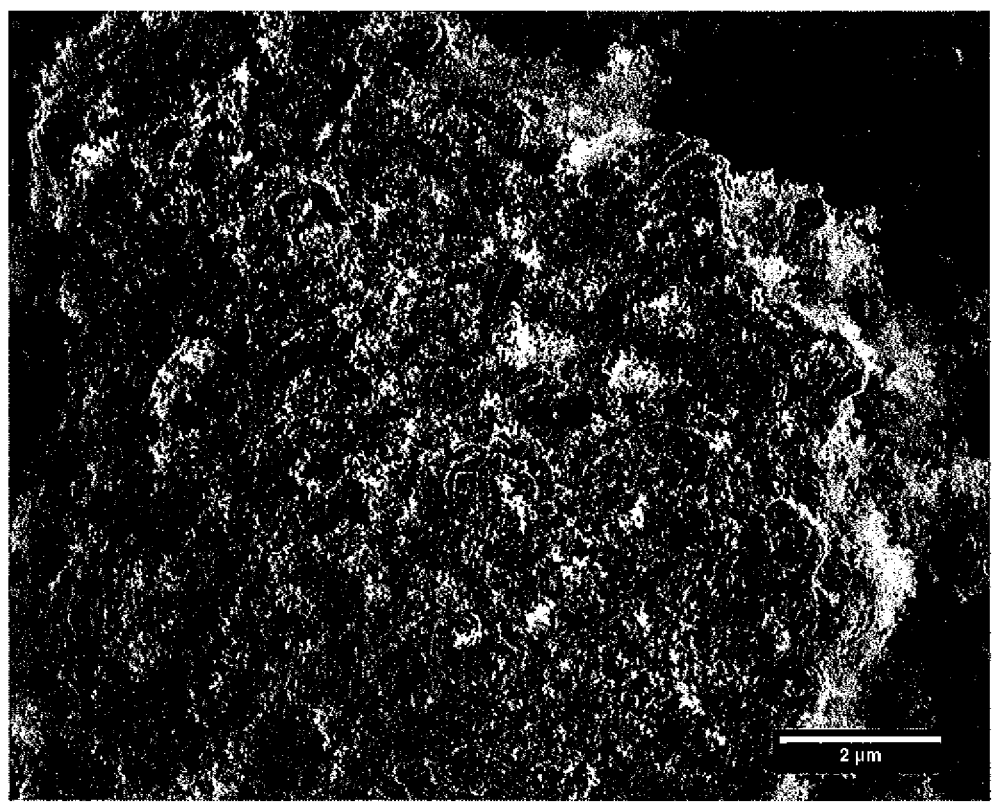
FIG. 3 shows a SEM micrograph of a newly manufactured NCS particle of CaO(/Ca(OH)2) coated with nanoparticles.
Figure 4:
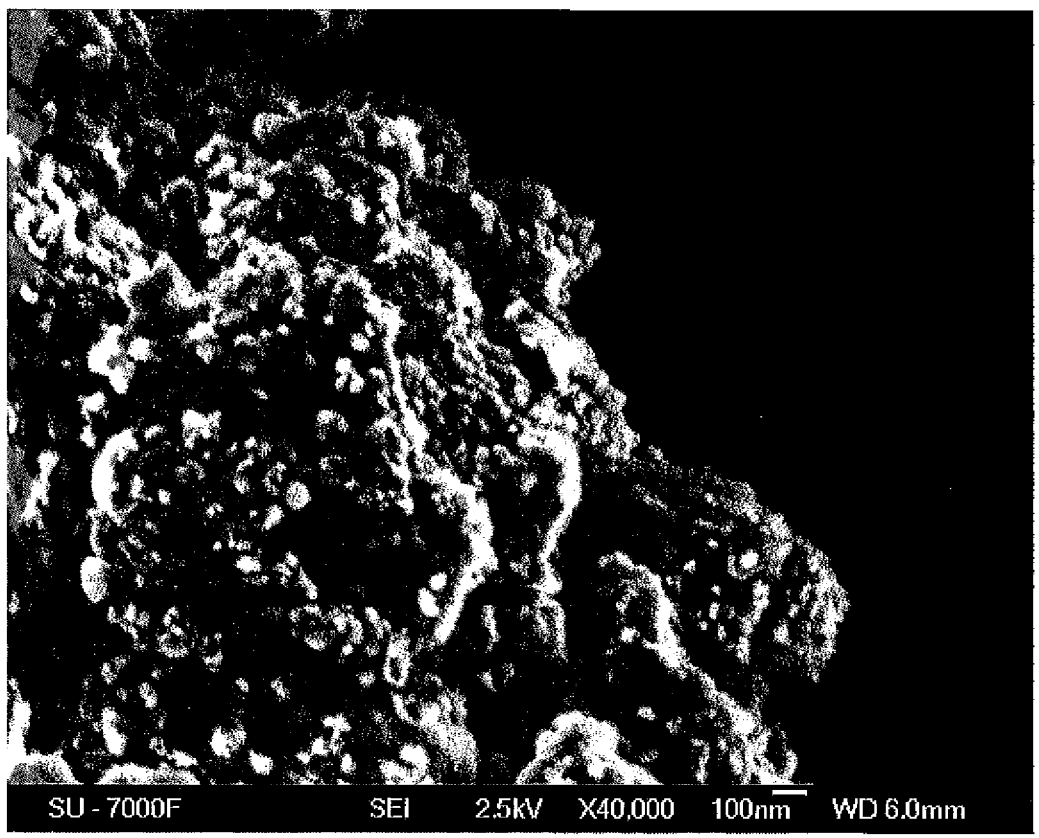
FIG. 4 shows a SEM micrograph of the same NCS particle as in FIG. 3 after 1300 cycles.

Study of the stability of the CaO coated with nanoparticles was made during the absorption process described above. The electron microscope pictures of CaO/Ca(OH)2 coated with nanoparticles were made after 1300 charge/discharge cycles and compared with electron microscope pictures of un-cycled CaO/Ca(OH)2 coated with nanoparticles. The un-cycled CaO/Ca(OH)2 coated with nanoparticles and X10000 SEM picture is shown on FIG. 3 and after 1300 cycles on FIG. 4. The structure of CaO/Ca(OH)2 coated with nanoparticles remains the same.

Example 10

Reversibility of the CaO Coated with Nanoparticles when Used in an Absorption Process The CaO coated with nanoparticles was prepared according to example 7 above. An absorption machine was built and consisting of a reactor tube and a condenser/evaporator one. A reactor made of steel tube with 70 mm inner diameter and equipped with a steam channel of 40 mm diameter made of copper mesh. The reactor contains 300 grams of CaO coated with nanoparticles placed between the rector tube wall and the steam channel. The reactor was connected to a condenser/evaporator via a gas transport channel equipped with a pressure gauge and a vacuum pump connection. The condenser/evaporator was filled with 250 grams of water. The charge/discharge process is carried out in vacuum. The pressure is controlled by a pressure gauge.

The absorption tube was charged by heating the reactor to 470° C. during 12 hours in an oven. A heat sink on the condenser/evaporator side is an ambient air of approximately 21° C.

The absorption machine was discharged during 3 hours. The condenser/evaporator temperature was kept between 60-70° C. The reactor temperature rise was registered continuously with temperature sensor. The condenser/evaporator mass change was measured during discharge cycle.

30 cycles have been performed according to 110-111. The condenser/evaporator mass change made up 96.0-97.0 grams every cycle. The peak reactor temperature varied between 380-420° C. when the reactor start temperature (at the beginning of discharge) varied between 270-320° C. Therefore no degradation in performance has been measured.

The reactor tube was open after 27 cycles in order to inspect the quality of the powder consisting of CaO coated with nanoparticles. The powder possesses the same color as at the start and does not include "hard" agglomerates.

Example 11

In one experiment 90 parts of solid CaO was placed into a blender of type OBH Nordica 1.5 L and 10 parts of a nanoparticles of graphite of type MKN-CG-400 MK Impex Corp. Mixing was carried out at >10 000 rpm during two intervals of approximately 30 s. The resulting material was a dry and free flowing ash-like powder.

The invention claimed is:

1. A particle comprising an inner part and an outer coating, wherein said inner part comprises at least one salt and said outer coating comprises hydrophobic nanoparticles having an average size of from 1 to 50 nm, wherein the particle has an average size from 1 to 1000 μm.

2. The particle according to claim 1, wherein said salt is hygroscopic.

3. The particle according to claim 1, wherein said salt is selected from the group consisting of chlorides, chlorates, perchlorates, bromides, iodides, carbonates and nitrates of lithium, magnesium, calcium, strontium, barium, cobalt, nickel, iron, zinc, manganese, potassium, and aluminum and sulphides and hydroxides of lithium, sodium and potassium.

4. The particle according to claim 1, wherein said salt is selected from the group consisting of $Na_2S$, LiBr, LiCl, $CaCl_2$, and $CaBr_2$.

5. The particle according to claim 1, wherein said nanoparticles comprise at least one material selected from the group consisting of hydrophobically modified $SiO_2$ particles and carbon materials.

6. The particle according to claim 1, wherein said hydrophobic nanoparticles comprise $SiO_2$ nanoparticles, and the $SiO_2$ nanoparticles are modified by covalently bound hydrophobic compounds.

7. The particle according to claim 1, wherein said particle further comprises at least one liquid.

8. The particle according to claim 1, wherein said particle further comprises water.

9. A device adapted to perform an absorption process, said device comprising at least one particle, wherein said particle comprises an inner part and an outer coating, wherein said inner part comprises at least one salt, wherein said outer coating comprises hydrophobic nanoparticles having an average size of from 1 to 50 nm, and wherein said particle has an average size from 1 to 1000 μm.

10. The device according to claim 9, wherein said salt is hygroscopic.

11. The device according to claim 9, wherein said salt is at least one salt selected from the group consisting of chlorides, chlorates, perchlorates, bromides, iodides, carbonates, and nitrates of lithium, magnesium, calcium, strontium, barium, cobalt, nickel, iron, zinc, manganese, potassium, and aluminum, and sulphides and hydroxides of lithium, sodium and potassium.

12. The device according to claim 9, wherein said salt is selected from the group consisting of $Na_2S$, LiBr, LiCl, $CaCl_2$, and $CaBr_2$.

13. The device according to claim 9, wherein said nanoparticles comprise at least one material selected from the group consisting of hydrophobically modified $SiO_2$ particles and carbon materials.

14. The particle according to claim 9, wherein said hydrophobic nanoparticles comprise $SiO_2$ nanoparticles, and the $SiO_2$ nanoparticles are modified by covalently bound hydrophobic compounds.

15. The device according to claim 9, wherein said particle further comprises at least one liquid.

16. The device according to claim 9, wherein said particle further comprises water.

17. The device according to claim 9, wherein said device is an absorption chemical heat pump.

18. The device according to claim 9, wherein said device is an apparatus for cooling adapted to utilize an absorption process.

19. The device according to claim 9, wherein said device is a machine for gathering excess heat adapted to utilize an absorption process.

20. The device according to claim 9, wherein said device is a device for storage of energy adapted to utilize an absorption process.

21. The device according to claim 9, wherein said device is a thermal solar collector adapted to utilize an absorption process.

22. The device according to claim 9, wherein said device is a roof brick or roof cover panel for production of cooling and heating adapted to utilize an absorption process.

23. An absorption process, comprising contacting a particle according to claim 1 with a liquid or gas.

24. The process according to claim 23, wherein said absorption process is carried out in a chemical heat pump.

25. A process for storage of chemical energy, comprising contacting a particle according to claim 1 with a liquid or gas.

26. Method for manufacturing a particle comprising an inner part and an outer coating, said inner part comprising at least one salt and said outer coating comprising hydrophobic nanoparticles having an average size of from 1 to 50 nm, said method comprising the steps: a) mixing the at least one salt with the hydrophobic nanoparticles, and b) mixing with sufficient energy to obtain particles comprising the at least one salt coated with the hydrophobic nanoparticles.

27. The method according to claim 26, wherein the at least one salt and the nanoparticles are mixed together with at least one liquid in step a).

28. The method according to claim 27, wherein said liquid is water.

29. The particle according to claim 1, wherein said particle has an average size from 5 to 500 μm.

30. The particle according to claim 1, wherein said particle has an average size from 20 to 100 μm.

31. The device according to claim 9, wherein said particle has an average size from 5 to 500 μm.

32. The device according to claim 9, wherein said particle has an average size from 20 to 100 μm.

33. The method according to claim 26, wherein said particle has an average size from 5 to 500 μm.

34. The method according to claim 26, wherein said particle has an average size from 20 to 100 μm.

* * * * *